June 7, 1949.  H. E. DIAPER  2,472,651
FASTENER
Filed March 15, 1944  4 Sheets-Sheet 4
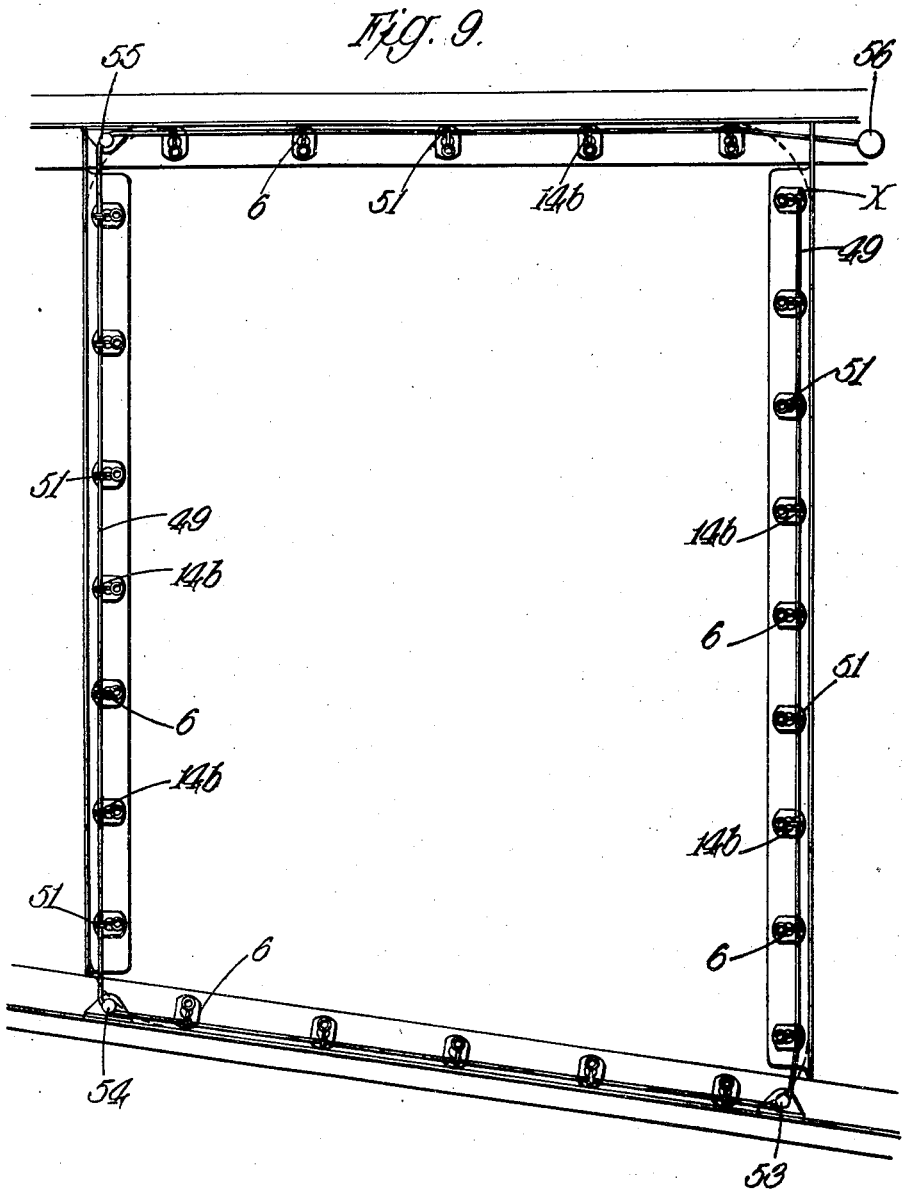
Inventor
H. E. Diaper.
by Wilkinson & Mawhinney
Attorneys Patented June 7, 1949

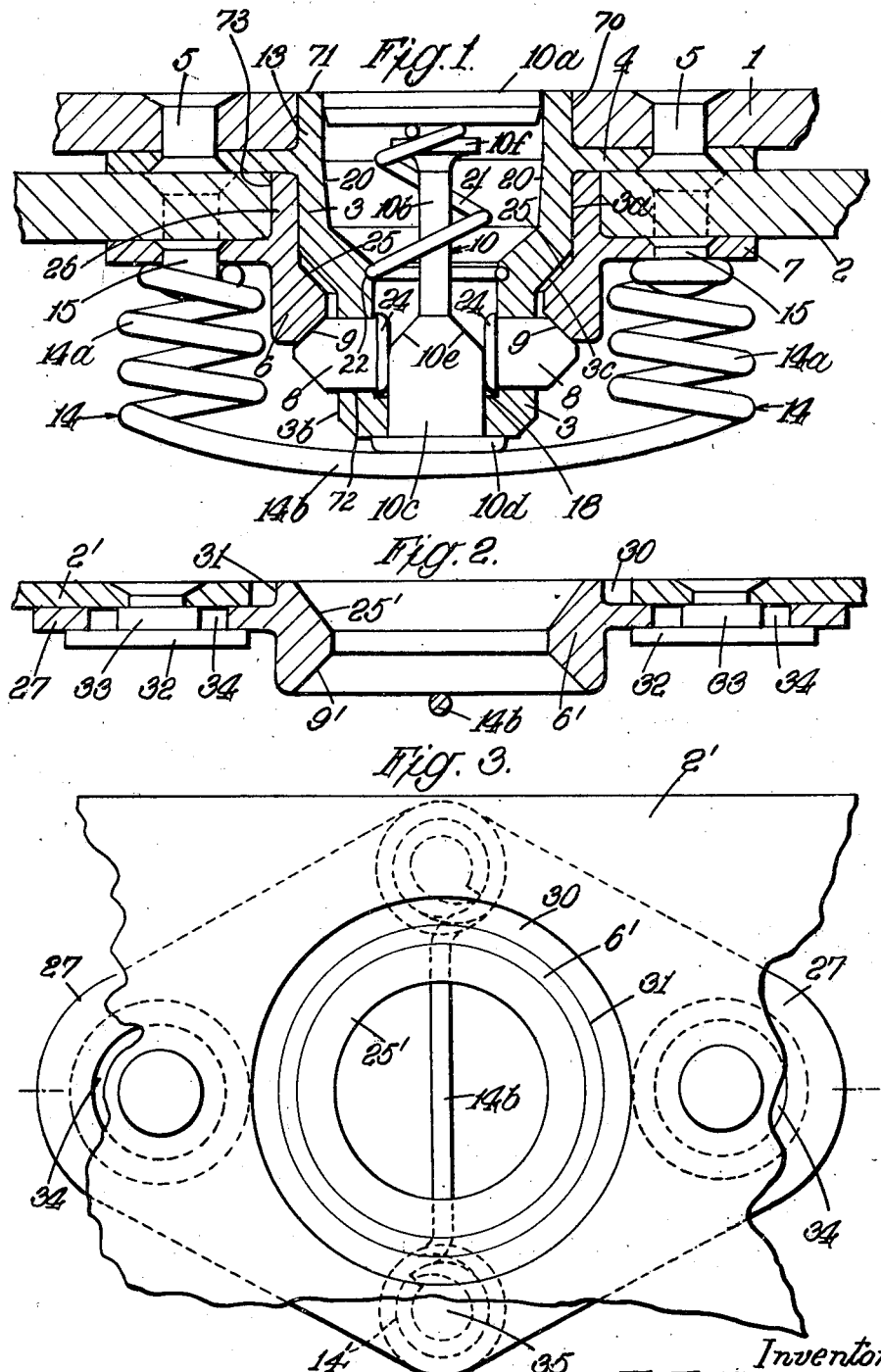

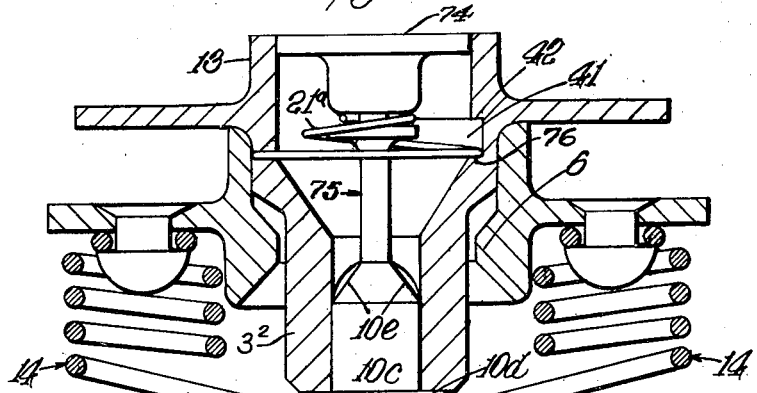
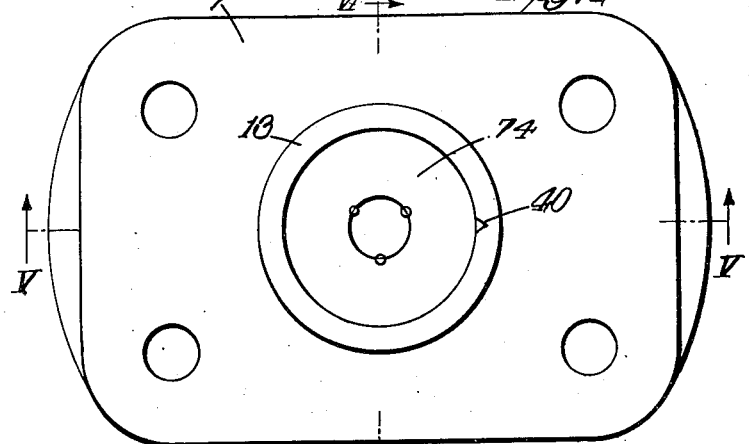
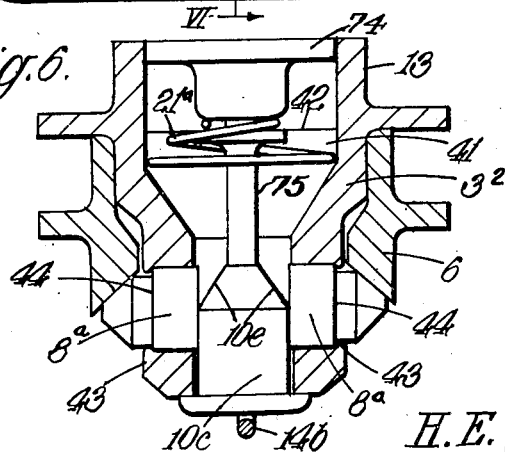

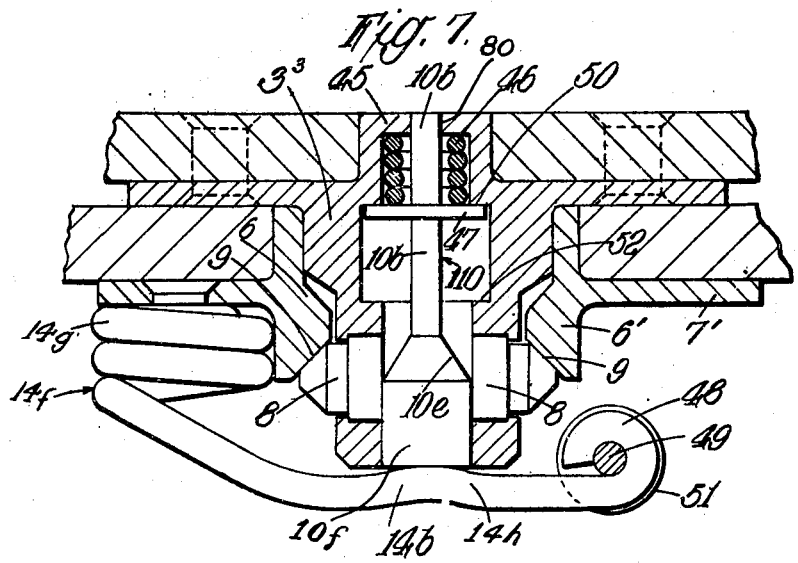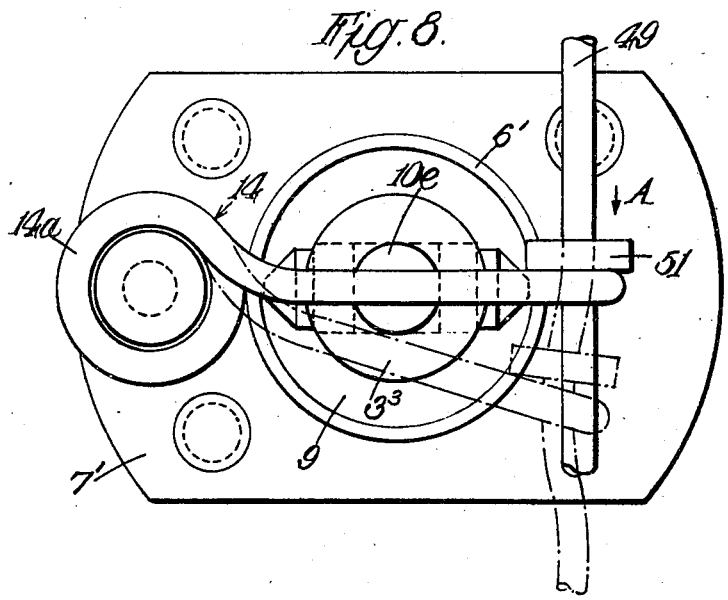

2,472,651

UNITED STATES PATENT OFFICE 2,472,651

FASTENER

Herbert Edward Diaper, Bitterne, Southampton, England, assignor to Aviation Developments Limited, Garden City, Hertford County, England, a British company Application March 15, 1944, Serial No. 526,593
In Great Britain March 17, 1943

6 Claims. (Cl. 24—221)

This invention relates to fasteners for use in securing two parts together.

A particular object of the invention is to provide a fastener suitable for securing surface parts of an aircraft together in such a way that, while the fastener may be readily actuated, it is flush with the surface. A fastener so constructed may be used with advantage for securing the cowling to the engine-supporting structure of the aircraft or for securing a stressed panel in an aircraft wing.

Another object of the invention is to provide a fastener which is capable of transmitting the very considerable shear loads that arise in the stressed coverings of aircraft wings.

A further object of the invention is to provide a fastener which can readily be released by pressure on a push-button or the equivalent but which will securely hold the two parts together till it is released.

These and other objects will be more apparent from the following description, when read in conjunction with the annexed drawings, in which—

Figure 1 is a sectional elevation of one form of fastener;

Figure 2 is a sectional elevation of part of a second form of fastener;

Figure 3 is a plan showing the part appearing in Figure 2;

Figure 4 is a plan of a third form of fastener;

Figure 5 is a section on the line V—V in Figure 4;

Figure 6 is a section on the line VI—VI in Figure 4;

Figure 7 is a sectional elevation of a fourth form of fastener;

Figure 8 is a plan of the fastener in Figure 7 as viewed from below; and

Figure 9 is a diagrammatic plan showing means whereby the fastener of Figures 7 and 8 may be operated.

The fastener in Figure 1 secures a panel 1 to a framework comprising a member 2. The panel 1 may, for example, be part of the covering of an aircraft wing having a stressed skin, and the member 2 may be a portion of, or secured to, the framework of the wing. The fastener comprises two components, one secured to each part to be fastened by the fastener. The first component includes a tubular projection 3 formed with a flange 4 secured by countersunk rivets 5 to the panel 1. The second component comprises a tubular socket 6 having a flange 7 riveted to the member 2, and in operation the projection 3 lies inside the socket 6. It will be seen that the projection 3 includes cylindrical surfaces 3a and 3b joined by a conical surface 3c. The projection 3 is maintained in engagement with the socket 6 by two radially movable locking elements in the form of bolts 8 that project laterally from the projection 3, so that conical faces of the bolts 8 engage inclined cam surfaces 9 formed inside the socket 6. The tubular projection 3 contains a press-button member comprising a head 10a connected by a shank 10b to an enlarged portion 10c, and when the fastener is in action, this enlarged portion 10c holds the bolts 8 in the positions shown in Figure 1 by virtue of its interposition between the inner ends of the bolts 8. The outer surface of the head 10a, when the press-button is in this position, is flush with the outer edge 71 of a backward extension 13 of the projection 3 that lies within a corresponding aperture 70 in the panel 1, this outer edge, in turn, being flush with the exposed surface of the panel 1. Thus, the outer surface of the head 10a and the edge of the extension 13 present a smooth and streamlined extension of the outer surface of the panel 1. The press-button is held in the position shown in Figure 1 by a spring 14 formed with two helices 14a secured by rivets 15 to the flange 7 on the socket 6. The helices 14a merge into a cross wire 14b which is the portion of the spring 14 that actually engages the press-button 10 to hold a flange 10d at the inner extremity thereof in engagement with the inner end of the tubular projection 3, the latter being formed internally with a flange 18 that guides the enlarged portion 10c when the press-button is forced inwards against the resilient action of the spring 14.

In order to release the panel 1, the head 10a is pushed inwards against the action of the spring 14 until a conical portion 10e, that joins the enlarged portion 10c of the press-button member to the shank 10b, lies beyond the bolts 8 to such an extent that the bolts can recede far enough into the tubular projection 3 to be withdrawn from the socket 6. This movement, which is conveniently effected by thumb pressure on the head 10a, is sufficient to cause the latter to become wedged in a tapered internal surface 20 formed on the tubular projection 3. Thus, the thumb pressure can be removed entirely before the parts of the fastener are separated, because the frictional engagement of the tapered surface 20 with the periphery of the head 10a prevents the spring 14 from returning the press-button member 10 to the position relatively to the tubular projection 3 shown in Figure 1. If the panel 1 is free to move, however, the spring 14 partially ejects the projection 3 and press-button member 10 as a unit from the socket 6. The fastener is thereupon no longer in a condition to prevent the panel 1 from being lifted away from the member 2. As the projection 3 is ejected or withdrawn from the socket 6, the cam action of the inclined surfaces 9, in the socket 6, on the exposed ends of the bolts 8 causes the latter to slide through guides 12 in the wall of the projection 3 towards the shank 10b which, by virtue of the inward position of the press-button, is now in register with the inner ends of the bolts 8. When the tubular projection 3 has been withdrawn a certain distance through the socket 6, the inner extremity 10d of the press-button separates from the cross wire 14b and ultimately the bolts 8 and the inner end of the enlarged portion 10c of the press-button, as well as the inner end of the tubular projection 3, are clear of the member 2 and the socket 6. The flange 10d at the inner end of the press-button member 10 is then exposed so that the head 10a can be eased from the tapered surface 20. However, a spiral tension spring 21, which is stressed when the parts are in the position shown in Figure 1 but which is not sufficiently strong to overcome the main spring 14, maintains the press-button in the position in which the enlarged portion 10c lies beyond the bolts 8 and this ensures that the bolts 8 are not held in such a position as to prevent the projection 3 from being returned to its operative position. It will be seen that the spiral spring 21 is anchored at one end in a groove 22 within the tubular projection 3 and at the other end between the head 10a of the press-button and a flange 10f near the upper end of the shank 10b. When the projection 3 is free from the socket 6 and from the member 2, the bolts 8 are prevented from falling outwards and away from the tubular projection 3 by flanges 24 at the inner ends of the bolts.

When it is desired to return the panel 1 to the position in which it is locked to the member 2, the projection 3 is thrust into the socket 6, and if the bolts 8 happen to be projecting too far outwards from the projection 3 they are returned to their inner positions by inclined cam surfaces 25 formed inside the socket 6. However, as the movement approaches its end and the bolts 8 pass into register with the inclined cam surfaces 9 at the inner end of the socket 6, the cross wire 14b of the main spring 14 acts once more on the press-button 10 to return it to the position shown in Figure 1 against the action of the tension spring 21. The conical surface 10e on the press-button therefore moves relatively to the projection 3 so as to engage the flanges 24 on the bolts 8 and thrust the latter outwards until they are in the locking position, shown in Figure 1, in which they securely engage the inclined cam surfaces 9 on the socket 6.

A particular advantage of the construction shown in Figure 1 is that the fastener will withstand very substantial shear loads, which is necessary in view of the great shear stresses that arise in the stressed coverings of aircraft wings. One reason for this ability to withstand large shear stresses is that the aperture necessary to receive the extension 13 of the projection 3 is lined by that extension 13 which, in turn, is internally reinforced by the head 10a of the press-button member 10. Furthermore, the surface 3a of the projection 3 is a neat sliding fit in an extension 26 of the socket 6 that fits within a corresponding aperture 73 in the member 2.

If a fastener in accordance with the invention is not required to withstand large shear loads, a socket 6' of the nature shown in Figures 2 and 3 may be employed. This socket is formed with a diamond-shaped plate 27 and with inclined internal surfaces $9^1$ and $25^1$ corresponding to the surfaces 9 and 25 in Figure 1. The plate 27 is free to undergo transverse movement relatively to a member $2^1$, which corresponds to the member 2 in Figure 1 in that the member 2 is the one to which a panel (not shown) is to be secured. To provide this freedom of movement the member $2^1$ is formed with an opening 30 providing substantial clearance with respect to an external surface 31 of the socket at $6^1$. Furthermore, the diamond-shaped plate 27 is held against the member $2^1$ by flanges 32 on members 33 which are riveted to the member $2^1$ and which pass through holes 34 in the plate 27, these holes providing very substantial clearance relatively to the members 33. The main spring 14' corresponding to the spring 14 in Figure 1 is secured to the plate 27 at the localities 35 (Figure 3) and comprises a cross wire 14b for engaging the inner end of the press-button member.

As the socket $6^1$ shown in Figures 2 and 3 is free to undergo limited movement transversely to the fastener axis, the tubular projection secured to the panel corresponding to the panel 1 (Figure 1) or the like does not have to be so accurately fitted as in the construction of Figure 1 where the two main parts of the fastener must register exactly with each other.

The fastener shown in Figures 4 to 6 is in many respects similar to that shown in Figure 1, and the same reference numerals are used for parts exactly corresponding to similar parts appearing in Figure 1. The main difference between the two constructions consists in the manner in which the press-button is automatically latched in its inner position after it has been thrust inwards against the action of the main spring 14 to enable the tubular projection $3^2$ to be withdrawn from the socket 6. The arrangement is such that, when pressure is manually applied to the head 74 of the press-button 75, this pressure is not applied axially but to the side of the press-button indicated by an index 40 (Figure 4) marked on the exposed edge of the extension 13 of the tubular projection 3. The result of this is that, when the head 74 has been moved inwards far enough for the enlarged portion 10c and conical part 10e of the press-button to be clear of the bolts $8^a$, the press-button is permitted to tilt slightly by a recess 41 formed on the side of the internal surface of the tubular projection 3 corresponding to the index 40. Accordingly, the top of the adjacent edge of the head 74 engages beneath the top surface 42 of the recess 41 as soon as the pressure on the press-button is released, the main spring 14 providing sufficient pressure to maintain the head 74 tightly in engagement with the surface 42 so that the press-button is held securely in the position in which the bolts $8^a$ are free to move inwards towards the axis of the projection 3. In this case, the spiral spring $21^a$, which is expanded axially when the parts are in the positions shown in Figure 5, serves the additional function of returning the press-button member 10 to the position in which it is coaxial with the socket 6. This occurs when the projection $3^2$ has been removed sufficiently far from the socket 6 for the flange 10d at the inner end of the press-button member to be substantially separated from the main spring 14. In other words, as soon as the main spring 14 ceases to exert the outward thrust necessary to maintain the head 74 tightly in engagement with the surface 42, the spiral spring 21a unlatches the press-button 15. However, the spiral spring 21a performs also the function, which it fulfills in the construction in Figure 1, of holding the press-button member in its inner position until the tubular projection 3² is once more thrust into the tubular socket 6 sufficiently far for the spring 14 to force the press-button 10 outwards, against the axial pressure of the spiral spring 21a, to the position shown in Figure 5. The lowermost and largest convolution of spring 21a is seated upon a shoulder 76 of the tubular member 3².

A minor difference between the construction of Figures 4 to 6 and the construction of Figure 1 is that the bolts 8a are prevented from escaping from the tubular projection 3² by flanges 43 on the member 3² that engage flanges 44 on the bolts.

When a panel is held in position by a number of fasteners of the kind described above with reference to Figures 1 to 6 and it is desired to remove the panel, it is necessary to push inwards the press-buttons in the fasteners in turn. The panel can then be lifted away from its supporting structure, but, when the panel is once more to be secured to the structure, it is simply necessary to move the panel so as to cause the tubular projections to slide into their associated fastener sockets until the press-buttons are thrust outwards to their latching positions whereupon the panel is again securely mounted. In some circumstances, however, it may be desirable to arrange for the fasteners also to be simultaneously released, thus avoiding the necessity for the operator to actuate the fasteners in succession. Such an arrangement is shown in Figures 7 to 9. Referring first to Figures 7 and 8, it will be seen that these show a fastener which, like the fasteners of the preceding figures, includes a tubular projection 3³ which fits into a tubular socket 6¹ and carries sliding bolts 8 that are held in engagement with inclined cam surfaces 9 by an enlarged end portion 10f of a plunger member 110 axially slidable in the tubular projection 3³. This plunger member 110 is equivalent to the press-button members shown in Figures 1 and 5 in that, besides the enlarged portion 10f, it includes a shank 10b of reduced diameter, connected by a conical portion 10e to the enlarged portion 10f. However, the plunger member is formed with no head to be engaged by the operator's thumb, but the shank 10b extends upwards into a small opening 80 in a wall 45 that closes the top of the tubular projection 3³. A compression spring 46, located between the wall 45 and a flange 47 on the shank 10b, tends normally to urge the plunger member downwards, as viewed in Figure 7. Such movement, however, is prevented by a main spring 14f comprising a helix 14g (secured to the flange 7¹ on the socket 6¹), a cross wire 14h (engaging the base of the enlarged portion 10f of the plunger member), and a bend 48 that embraces a cable 49. This main spring holds the plunger member 110 with the flange 47 in engagement with a shoulder 50. When it is desired to undo the fastener, the cable 49 is pulled in the direction of the arrow A in Figure 8 so that a collar 51, secured to the cable 49, pushes on the bend 48 of the main spring 14 and swings the cross wire 14h to the position shown in chain lines in Figure 8. The cross wire 14h is therefore moved clear of the plunger member 110 so that the compression spring 46 thrusts the plunger member downwards to a position in which the flange 47 engages a shoulder 52 in the tubular projection 3³. The shank 10b of the plunger member is then in register with the bolts 8, which are free to slide inwards clear of the socket 6¹. A visual indication is given of the fact that the fastener has thus been undone by the disappearance of the end of the shank 10b from the opening in the exposed wall 45.

When it is desired once more to secure the fastener, the tension in the cable 49 is relaxed to allow the main spring to return to its original position in which the cross wire 14h is in the position shown in full lines in Figure 8. Then, when the tubular projection 3³ is thrust into the socket 6' far enough for the end 10f of the plunger member 110 to engage the cross wire 14h and for the bolts 8 to engage the inclined surfaces 9 on the socket 6', the plunger member is returned to the position shown in Figure 7 by the abutment provided by the cross wire 14h.

Figure 9 shows diagrammatically the manner in which the cable 49 is associated with a series of fasteners for securing a stressed panel to a wing framework to which are secured the sockets 6' of the fasteners. The cable 49 carries a series of collars 51 which coact respectively with the bends 48 at the ends of the cross wires 14h on the main springs of the various fasteners, and the cable 49 extends from a point X and, after traversing a line of nine fastener sockets, passes round a guide pulley 53 and then traverses five more fastener sockets to another guide pulley 54. After passing round this pulley the cable traverses seven more fastener sockets to a third pulley 55 and then, after passing five more sockets, terminates at a press-button 56 indicated diagrammatically in Figure 9. By operating this press-button 56 the cable 49 may be tensioned to deflect the cross wires 14h and release the fasteners.

What I claim is:

1. A fastener for securing two panels together comprising a tubular projection secured to one panel, locking means carried by said tubular projection and being arranged to move substantially laterally of said tubular projection, a press-button member carried by said tubular projection and movable substantially axially thereof, said press-button member having an enlarged portion for projecting said elements when moved therebetween, and a narrow portion for permitting the elements to be retracted when the enlarged portion is shifted out of the way, spring means reacting between said tubular projection and press-button member tending to move the enlarged portion out of the way of said elements, and means on the other panel arranged to move said press-button member against the action of said spring means to a position where the enlarged portion projects said locking elements.

2. A fastener as claimed in claim 1 characterized by the fact that said last named means comprises a coil spring with a cross wire projecting in the path of said press-button member.

3. A fastener for securing two panels together comprising a tubular projection secured to one of the panels, locking elements carried by said tubular projection and arranged to move substantially laterally of said tubular projection, a press-button member carried by said tubular projection and movable axially thereof, said press-button having an enlarged portion to spread and project said elements and a narrower portion to permit the elements to move inwardly, a tubular socket secured to the other panel and of a complemental size and shape to receive said tubular projection, said tubular socket having an inwardly projecting wall portion for engagement by said tubular projection on one side and by said elements when projected on the other side, a cross member carried by said socket and extending in the path of said press-button member to shift the press-button member to position projecting said elements.

4. A fastener as claimed in claim 3 further comprising a spring in the tubular projection acting between said projection and the press-button member tending to move the press-button member to a position permitting the retraction of said locking elements.

5. A fastener as claimed in claim 3 in which the cross member is carried upon the outer ends of coil springs affixed to the panel carrying the socket member.

6. A fastener as claimed in claim 3 wherein a flexible connection is attached to the cross member for moving it out of the axial line of said press-button member.

HERBERT EDWARD DIAPER.

REFERENCES CITED

The following references are of record in the file of this patent:

UNITED STATES PATENTS

| Number | Name | Date |
|---|---|---|
| 854,073 | Bruckner et al. | May 21, 1907 |
| 1,425,618 | Vodicka | Aug. 15, 1922 |
| 2,252,286 | Hathorn | Aug. 12, 1941 |
| 2,270,403 | Bignell | Jan. 20, 1942 |
| 2,337,457 | Dzus | Dec. 21, 1943 |

FOREIGN PATENTS

| Number | Country | Date |
|---|---|---|
| 8,321 | Great Britain | Apr. 10, 1907 |
| 23,646 | Great Britain | Nov. 16, 1905 |